(12) United States Patent
Van Dyke et al.

(10) Patent No.: US 6,205,929 B1
(45) Date of Patent: Mar. 27, 2001

(54) TROLLEY WHEEL

(75) Inventors: Verlan Van Dyke, Pella; Keith Korver, Des Moines; Perry Klein, West Des Moines, all of IA (US)

(73) Assignee: VGK Inc., Pella, IA (US)

( * ) Notice: Subject to any disclaimer, the term of this patent is extended or adjusted under 35 U.S.C. 154(b) by 0 days.

(21) Appl. No.: 09/007,350

(22) Filed: Jan. 15, 1998

(51) Int. Cl.$^7$ .................................................. B61B 3/00
(52) U.S. Cl. ..................... 105/150; 105/148; 104/89; 104/93; 104/115; 16/97
(58) Field of Search ........................... 104/89, 93, 110, 104/115; 105/148, 150; 16/87.2, 96, 97, 98, 102

(56) References Cited

U.S. PATENT DOCUMENTS

| | | | |
|---|---|---|---|
| D. 319,131 | 8/1991 | Smeitink . | |
| 331,758 | * 12/1885 | Barrett | 104/93 |
| 2,566,962 | * 9/1951 | Ramsey | 105/150 |
| 2,581,948 | * 1/1952 | Flounders | 105/150 |
| 2,718,852 | * 9/1955 | Cacciatore | 104/93 |
| 3,252,427 | * 5/1966 | Bailey | 105/89 |
| 3,429,278 | 2/1969 | Gonzales . | |
| 3,439,628 | 4/1969 | Mendelson . | |
| 3,587,473 | 6/1971 | Weiss . | |
| 3,712,236 | 1/1973 | Massaglia . | |
| 3,724,387 | 4/1973 | Civitarese . | |
| 3,738,477 | 6/1973 | Gename . | |
| 3,739,424 | 6/1973 | Gonsalves et al. . | |
| 3,759,190 | 9/1973 | Harvey . | |
| 3,787,925 | 1/1974 | Dawson . | |
| 3,827,367 | 8/1974 | Paglia . | |
| 3,909,066 | 9/1975 | Snowden . | |
| 3,926,303 | 12/1975 | McCall . | |
| 3,971,601 | 7/1976 | Sytsma . | |
| 4,109,343 | 8/1978 | Weis et al. . | |
| 4,144,847 | 3/1979 | Morita . | |
| 4,153,303 | 5/1979 | Tanner . | |
| 4,228,738 | 10/1980 | Forshee . | |
| 4,384,387 | 5/1983 | Pachuta . | |
| 4,423,685 | 1/1984 | Kerckhoff . | |
| 4,464,997 | 8/1984 | Dehne . | |
| 4,464,998 | 8/1984 | Wakabayashi . | |
| 4,484,525 | 11/1984 | Forshee et al. . | |
| 4,520,733 | 6/1985 | Willmann . | |
| 4,905,605 | 3/1990 | Shishido et al. . | |
| 4,913,459 | 4/1990 | Smeitink . | |
| 4,993,328 | 2/1991 | Wendt et al. . | |
| 5,019,789 | 5/1991 | Rosin et al. . | |
| 5,039,123 | 8/1991 | Smeitink . | |
| 5,085,150 | 2/1992 | Moore et al. . | |
| 5,125,675 | 6/1992 | Engelbrecht . | |
| 5,156,533 | 10/1992 | Hoffman et al. . | |
| 5,209,167 | 5/1993 | Donner et al. . | |
| 5,231,933 | 8/1993 | DiRosa . | |
| 5,277,126 | 1/1994 | Wendt et al. . | |
| 5,357,868 | 10/1994 | Maas . | |
| 5,398,618 | 3/1995 | McMullen . | |
| 5,479,862 | 1/1996 | Waterkamp . | |
| 5,664,502 | 9/1997 | Wilhelm . | |

* cited by examiner

Primary Examiner—Mark T. Le
Assistant Examiner—Robert J. McCarry, Jr.
(74) Attorney, Agent, or Firm—Brett J. Trout; Gunderson, Weindruch, Trout & Rhein, P.C.

(57) ABSTRACT

An improved trolley for use on a track. The improved trolley is of a sandwich construction having a wear resistant interior and a pair of metal end plates. The wear resistant material is preferably plastic or other material designed to avoid damaging a track along which the trolley rides. The end plates are preferably stainless steel and of a diameter greater than the diameter of the center wheel to prevent the trolley from becoming dislodged from a track. By providing a sandwich of long wearing and non brittle materials, the longevity of the trolley is increased and corrosion concerns associated with prior art devices is substantially alleviated.

11 Claims, 4 Drawing Sheets

TROLLEY WHEEL

BACKGROUND OF THE INVENTION

1. Field of the Invention

The present invention relates in general to a trolley wheel, and more specifically, to an improved trolley wheel having superior wear characteristics.

2. Description of the Prior Art

Animal carcasses are transported in meat packing plants typically through the use of meat hooks. Each meat hook is secured to a wheel by a strap or other connection means to form a trolley. The trolleys move along a track system to transport the carcasses from place to place. Each trolley typically includes a wheel having a recessed rolling surface which rides along the track system and a pair of perimeter flanges to prevent the wheel from "jumping the track." A typical meat packing operation may employ hundreds or thousands of such trolleys.

Prior art trolley wheels are typically constructed of iron, or a similarly soft material, so as not to cause excessive wear on the track system. The wheels are typically provided with a brass or other type of bushing to allow the wheels to turn upon an axle. While the iron construction of the wheel does reduce the amount of wear on the track, iron tends to rust. Over time, however, this rust begins to flake off the wheel. If rust flakes fall off the wheel and onto the animal carcass hanging below, contamination is a significant concern.

An additional drawback associated with prior art wheels is the difficulty in cleaning such wheels. To clean the wheels and remove rust flakes, the entire trolley is typically washed in hot caustic. The caustic aids in removing rust flakes, while the temperature of the caustic, typically one hundred and eighty degrees, kills bacteria on the wheel. The heat also serves to aid in the drying of the trolley when the trolley exits the caustic.

A light coating of oil is applied to prior art trolleys to reduce oxidation and rust. After the trolleys exit the hot caustic, the oil cannot be applied until the trolley is dry. Although the heat of the trolley exiting the caustic aids in drying the trolley very quickly, the freshly cleaned metal is exposed to the atmosphere for a short time before the oil is applied. During this short period of time, oxygen in the atmosphere oxidizes the trolley to form a thin coat of rust over the trolley. While most of this rust is removed during the next cleaning cycle, the constant rusting and rust removal subjects the trolley to premature wear.

Still another downside associated with the prior art is the likelihood of contamination as the light coating of oil slides down the trolley and drips down to contaminate the animal carcass. Still another drawback associated with the prior art is the short life span of the trolley wheel. The trolley wheel is constructed of iron, is continuously moved over a steel or otherwise hard surface, and is constantly worn down. The typical life span of a trolley wheel is, therefore, short, averaging a year or less depending upon the amount and severity of use.

The drawbacks associated with the prior art noted hereinabove are substantially eliminated by the present invention.

SUMMARY OF THE INVENTION

The present invention provides an improved wheel assembly having a center wheel sandwiched between a first end plate and a second end plate. Preferably, the center wheel is abrasion resistant while the end plates are stronger and less brittle. The diameter of the end plates is greater than that of the center wheel to create a pair of flanges. These flanges maintain the wheel in contact with a track. The center wheel and end plates are provided with holes which are aligned to accommodate an axle. Means are provided for securing the end plates to the center wheel.

In the preferred embodiment, the center wheel is Delrin, an acetal resin, while the end plates are stainless steel or similarly strong material. Also in the preferred embodiment, the center wheel is provided with circular bosses on either side, which fit through large holes provided in the end plates. The center wheel is secured to the end plates by bolts which extend through, and are welded to, the end plates.

DETAILED DESCRIPTION OF THE PREFERRED EMBODIMENT

Figure 1:
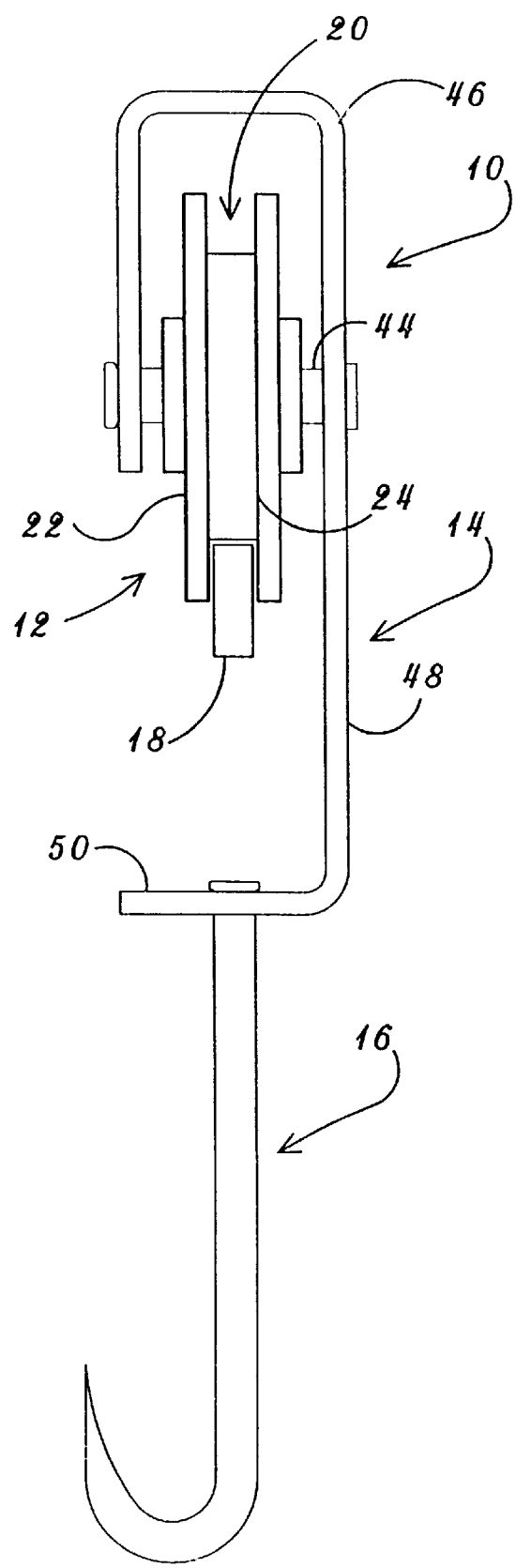
FIG. 1 is a front elevation showing the improved trolley wheel and trolley of the present invention positioned on a track.
Figure 2:
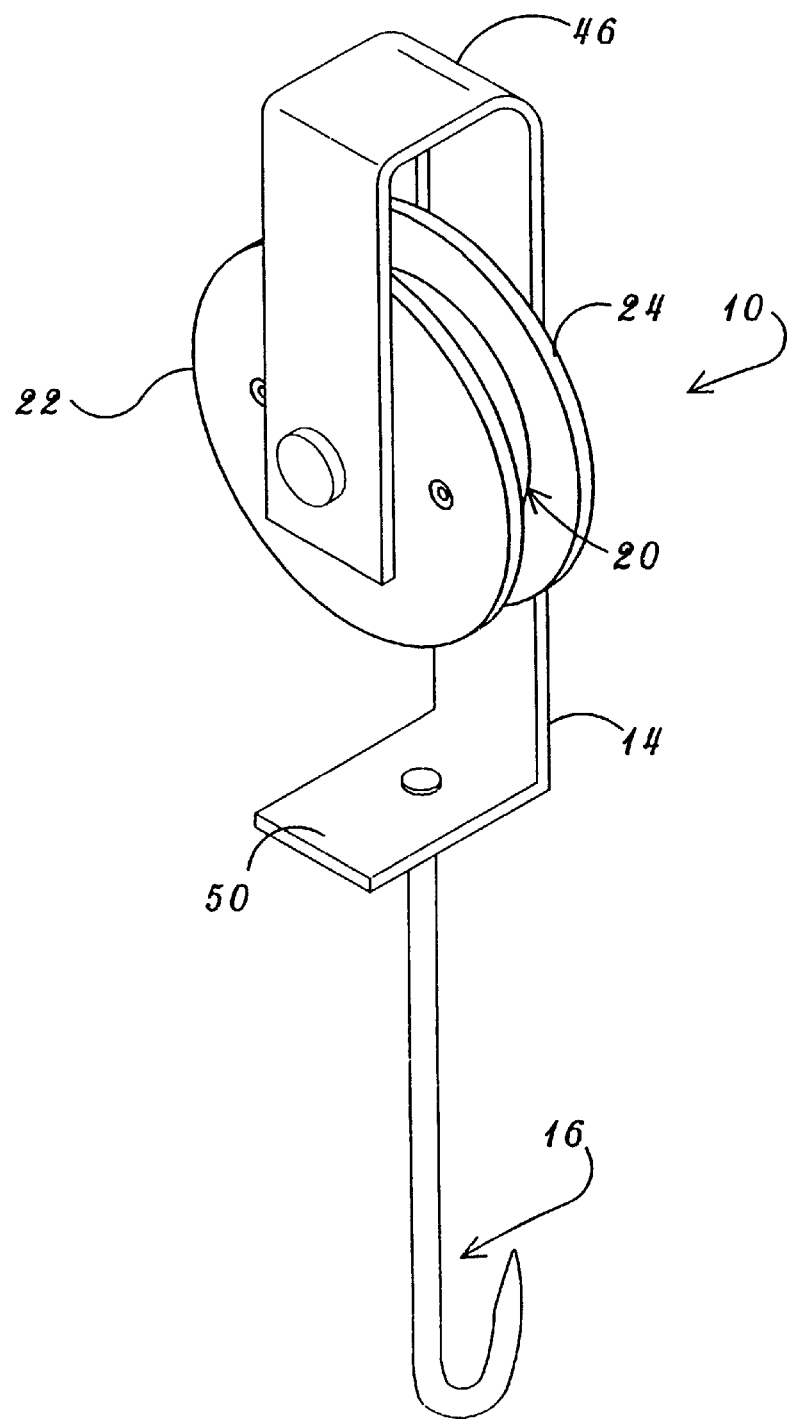
FIG. 2 is a perspective view of the trolley wheel and trolley of FIG. 1.
Figure 3:
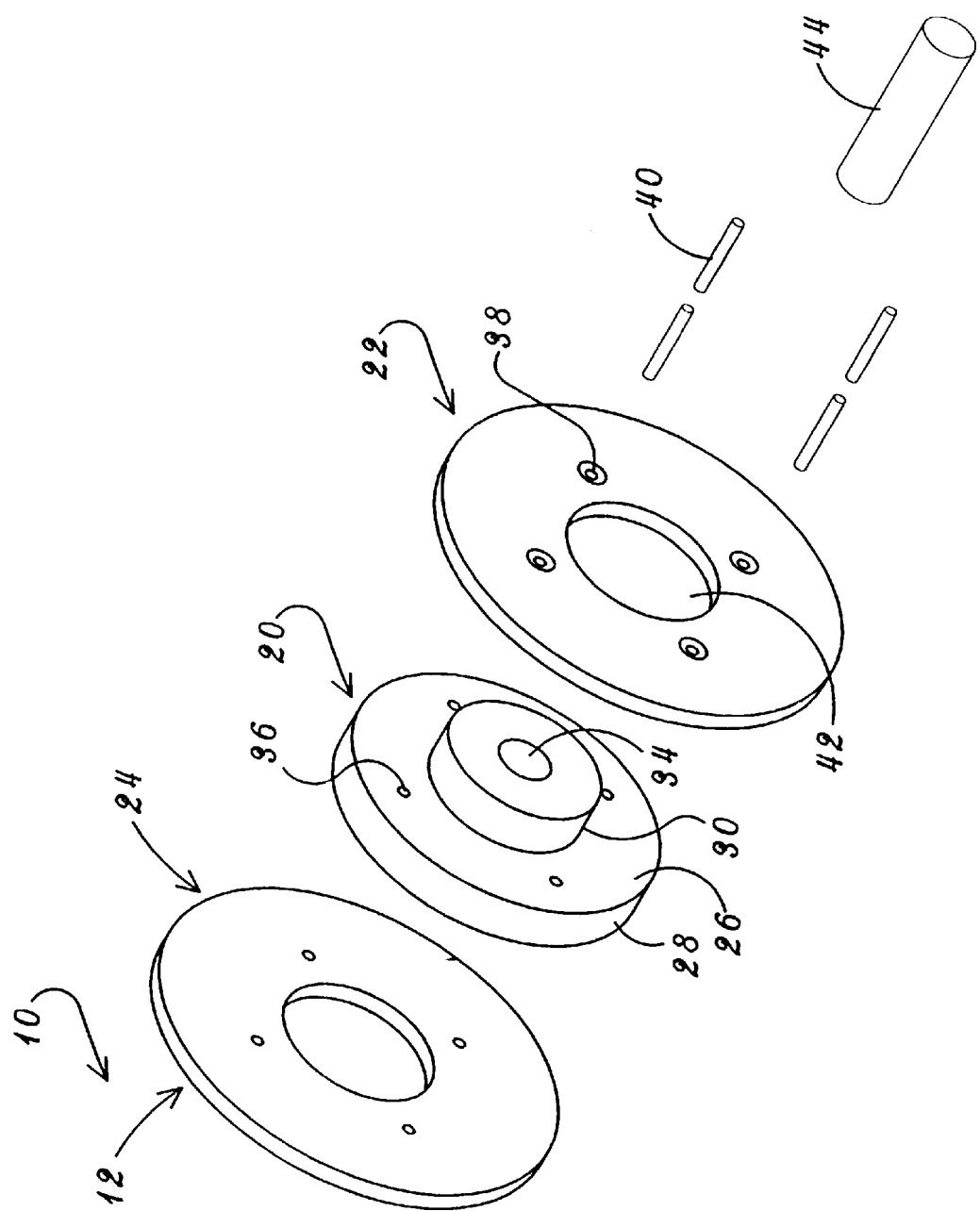
FIG. 3 is an exploded view of the trolley wheel of Fig. 1.

With reference to the drawings, a trolley is indicated generally as 10 in FIG. 1. The trolley 10 includes a wheel assembly 12 secured to a strap 14. Secured to the strap 14 is a meat hook 16. As shown in FIG. 1, the trolley 10 is adapted to ride along a track 18 with an animal carcass (not shown) secured to the meat hook 16. As shown in FIG. 3, the wheel 12 includes a center wheel 20 and two end plates 22 and 24.

Figure 5:
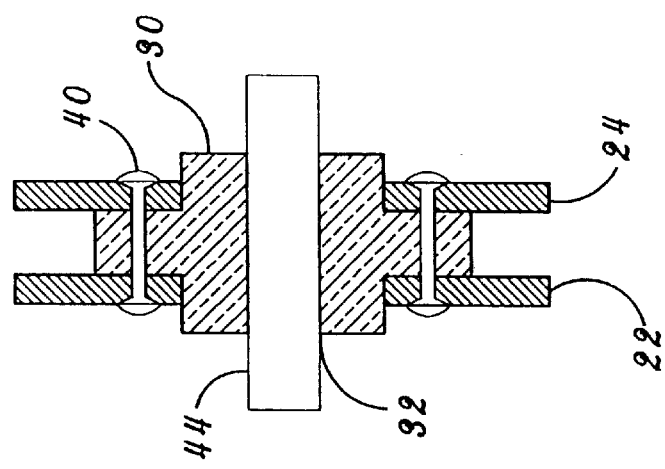
Fig. 5 is a front elevation in partial cross-section the trolley wheel of FIG. 4.

The center wheel 20 is preferably constructed of Delrin, an acetal resin. Of course, the center wheel 20 may be constructed of ultra high molecular weight (UHMW) plastic, a molded nylon plastic, or similarly durable material. The center wheel 20 is molded into a one-piece construction, having a main disk 26 with a contact surface 28. Molded onto the main disk 26 are a pair of bosses 30 and 32 (FIGS. 3 and 5). The center wheel 20 is also provided with an axle shaft 34 which extends through the main disk 26 and the bosses 30 and 32. The main disk 26 is also provided with four securement holes 36 for a purpose to be described below. Although the center wheel 20 may be constructed of any suitable dimensions, in the preferred embodiment, the center wheel 20 is 1.65 centimeters wide and 9.7 centimeters in diameter. The center wheel 20 may be between one centimeter and fifty centimeters in diameter and is preferably between one centimeter and twenty centimeters in diameter. The bosses 30 and 32 are 0.6 centimeters wide and 4.35 centimeters in diameter. The securement holes 36 are 0.7 centimeters in diameter while the axle shaft 34 is 2.1 centimeters in diameter.

Figure 6:
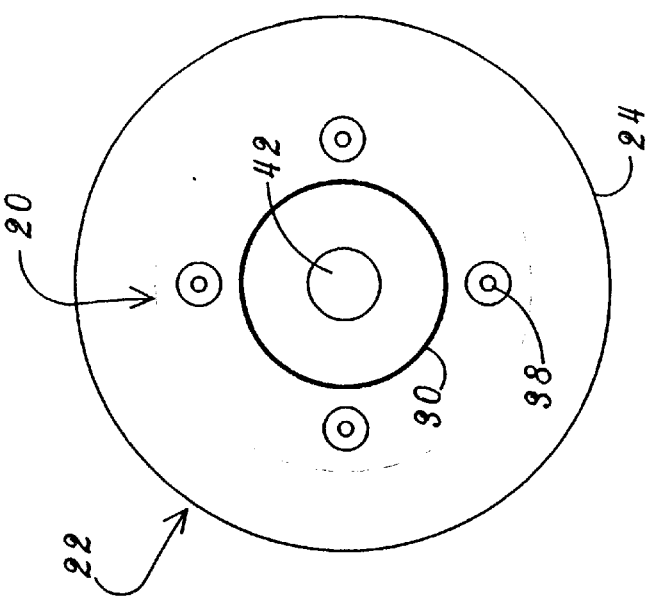
FIG. 6 is a side elevation of the trolley wheel of FIG. 4.

The end plates 22 and 24 are both preferably constructed of stainless steel and are 0.6 centimeter wide. The end plates 22 and 24 are 11.7 centimeters in diameter, have a center hole 4.4 centimeters in diameter and are provided with four securement holes 38.7 centimeters in diameter (FIGS. 3 and 6). As shown in FIG. 3, the wheel 12 is also provided with four securement pins 40 of a diameter suitable for insertion into the securement holes 36 and 38. The end plates 22 and 24 are provided with axle holes 42 to accommodate an axle 44.

Preferably, the end plates 22 and 24 are positioned over the bosses 30 and 32 aligning the securement holes 36 and 38. Thereafter, the securement pins 40 are positioned within the securement holes 36 and 38 and are welded or otherwise secured to the end plates 22 and 24. The axle 44 is then positioned within the axle holes 42 and axle shaft 34. As shown in FIG. 1, the wheel 12 is provided within a strap 14. It is preferably a stainless steel metal strap approximately 4 centimeters in width. The strap 14 is bent to form a generally U-shaped arch 46, a connector 48 and a lip 50. As shown in FIG. 1, the axle 44 is secured through holes (not shown) in the generally U-shaped arch 46 by weldments or similar securement means. Similarly, the meat hook 16 is secured through a hole (not shown) in the lip 50 by weldments, a nut, or similar securement means.

Figure 4:
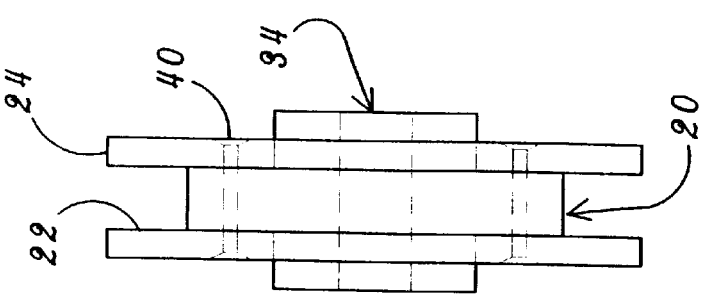
FIG. 4 is a front elevation in partial phantom of the trolley wheel.

As shown in FIGS. 4–5, the bosses 30 and 32 extend a sufficient distance through the end plates 22 and 24 so that the end plates 22 and 24 do not contact the axle 44. Similarly, the end plates 22 and 24 are of a sufficiently large diameter to extend beyond the center wheel 20 and prevent undesired lateral movement of the wheel 12 in relationship to the track 18 (FIGS. 1, 4 and 5).

Prior art trolleys are typically cleaned with a hot caustic solution to remove any flaking rust. By constructing the trolley out of plastic and stainless steel, rusting is substantially eliminated. Accordingly, the trolley 20 of the present invention can be cleaned with a non-caustic anti-bacterial detergent. Additionally, since the center wheel 20 is plastic, there is no need to oil or otherwise lubricate the center wheel 20 after cleaning. The novel construction of the trolley 20 also eliminates potential carcass contamination from falling rust and oil.

Although the invention has been described with respect to a preferred embodiment thereof, it is to be understood that it is not to be so limited, since changes and modifications can be made therein which are within the full intended scope of this invention as defined by the appended claims. For example, it is anticipated that instead of molding the bosses to the center disk, the bosses may be opposite ends of a cylinder positioned through the center of the center disk and secured by a cotter pin or similar securement means. This would allow the bosses to be constructed of a different material than the center disk.

What is claimed is:

1. An improved wheel assembly comprising:
   (a) a center wheel having a first hole and a first diameter, wherein said center wheel is constructed of an abrasion resistant material;
   (b) a first end plate having a second hole and a second diameter, wherein said first end plate is constructed of a material less brittle than said abrasion resistant material;
   (c) a second end plate having a third hole and a third diameter;
   (d) wherein said second end plate is constructed of a less brittle material than said abrasion resistant material;
   (e) wherein said second diameter and said third diameter are greater than said first diameter;
   (f) wherein said first hole and said second hole are substantially aligned;
   (g) an axle extending through said first hole, said second hole, and said third hole; and
   (h) means securing said first end plate and second end plate to said center wheel.

2. The improved wheel assembly of claim 1 further comprising:
   (a) a first boss provided on said center wheel around said first hole;
   (b) a second boss provided on said center wheel around said second hole;
   (c) wherein said first boss is secured within said second hole; and
   (d) wherein said second boss is secured within said third hole.

3. The improved wheel assembly of claim 1, further comprising a substantially U-shaped arch, wherein said axle is secured to said U-shaped arch.

4. The improved wheel assembly of claim 3, further comprising means, secured to said U-shaped arch, for supporting an animal carcass.

5. The improved wheel assembly of claim 1, wherein said center wheel is constructed of a substantially non-corrosive material.

6. The improved wheel assembly of claim 1, wherein said securing means is a plurality of bolts.

7. An improved trolley for use on a track, said trolley comprising:
   (a) a disk having a first face, a second face, a hole and a diameter;
   (b) wherein said disk is constructed of an abrasion resistant material;
   (c) a first boss having a hole and a diameter;
   (d) a second boss having a hole and a diameter;
   (e) wherein said first boss is secured to said first face of said disk in a manner which substantially aligns said hole of said disk with said hole of said first boss;
   (f) wherein said second boss is secured to said second face of said disk in a manner which substantially aligns said hole of said disk with said hole of said second boss;
   (g) a first end plate having a hole and a diameter;
   (h) wherein said diameter of said first plate is greater than said diameter of said disk;
   (i) wherein said first boss is secured in said hole of first end plate;
   (j) a second end plate having a hole and a diameter;
   (k) wherein said diameter of said second end plate is greater than said diameter of said disk;
   (l) wherein said second boss is secured in said hole of said second end plate;
   (m) wherein said first end plate and second end plate are constructed of a material less brittle than said abrasion resistant material; and
   (n) an axle positioned through said hole of said first end plate, said hole of said disk, said hole of first boss, said hole of said second boss, and said hole of said second end plate.

8. The improved trolley of claim 7, wherein said first boss and said second boss are round and provided with diameters less than said diameter of said disk.

9. The improved trolley of claim 7, further comprising a substantially U-shaped arch, wherein said axle is secured to said U-shaped arch.

10. The improved trolley of claim 9, further comprising means secured to said U-shaped arch for supporting an animal carcass.

11. The improved trolley of claim 7, wherein said disk is constructed of a substantially non-corrosive material.

* * * * *